US011134406B2

(12) United States Patent
Wang et al.

(10) Patent No.: US 11,134,406 B2
(45) Date of Patent: Sep. 28, 2021

(54) MEASUREMENT REPORTING METHOD AND APPARATUS

(71) Applicant: Huawei Technologies Co., Ltd., Shenzhen (CN)

(72) Inventors: Xiaona Wang, Chengdu (CN); Xiaoyong Tang, Shenzhen (CN); Peng Guan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 16/671,712

(22) Filed: Nov. 1, 2019

(65) Prior Publication Data
US 2020/0068422 A1 Feb. 27, 2020

Related U.S. Application Data

(63) Continuation of application No. PCT/CN2018/085758, filed on May 5, 2018.

(30) Foreign Application Priority Data

May 5, 2017 (CN) .......................... 201710314213.5

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0626* (2013.01); *H04L 5/0048* (2013.01); *H04W 72/046* (2013.01); *H04W 72/10* (2013.01)

(58) Field of Classification Search
CPC . H04W 24/10; H04W 72/044; H04W 72/046; H04W 72/06; H04W 72/10; H04B 7/0626; H04L 5/0048
See application file for complete search history.

(56) References Cited

U.S. PATENT DOCUMENTS 9,247,557 B2    1/2016  Liao et al.
9,532,362 B2 *  12/2016  Marinier ............. H04B 7/0617
(Continued)

FOREIGN PATENT DOCUMENTS

CN       1997195 A      7/2007
CN     101321373 A     12/2008
(Continued)

OTHER PUBLICATIONS

Huawei et al., "Beam measurement, reporting and indication", 3GPP TSG RAN WG1 Meeting #91, R1-1719422, Reno, USA, Nov. 27-Dec. 1, 2017, 12 pages.
(Continued)

*Primary Examiner* — Kevin D Mew
(74) *Attorney, Agent, or Firm* — Slater Matsil, LLP

(57) ABSTRACT

The present invention relates to a measurement reporting method, and a communications apparatus. In the method, measurement reporting parameters reported to a base station satisfies reporting rules including: (a) a reporting setting with a smaller identifier has priority over a reporting setting with a larger identifier; (b) a serving cell with a smaller identifier has priority over a serving cell with a larger identifier; (c) a reporting type involving a beam index indication has priority over a reporting type involving an RI; and (d) aperiodic measurement reporting has priority over semi-persistent measurement reporting, or semi-persistent measurement reporting has priority over periodic measurement reporting. According to the method, performance of a wireless communications system is improved.

20 Claims, 4 Drawing Sheets

(51) Int. Cl.
*H04L 5/00* (2006.01)
*H04W 72/04* (2009.01)
*H04W 72/10* (2009.01)

(56) References Cited

U.S. PATENT DOCUMENTS

| | | | | |
|---|---|---|---|---|
| 10,735,074 B2* | 8/2020 | Kwak | .................. | H04L 5/0023 |
| 2012/0201207 A1* | 8/2012 | Liu | ...................... | H04W 24/10 |
| | | | | 370/329 |
| 2012/0252487 A1* | 10/2012 | Siomina | ................ | H04W 24/10 |
| | | | | 455/456.1 |
| 2013/0322376 A1 | 12/2013 | Marinier et al. | | |
| 2014/0198681 A1 | 7/2014 | Jung et al. | | |
| 2015/0327106 A1* | 11/2015 | Lee | ...................... | H04L 1/0026 |
| | | | | 370/252 |
| 2015/0365219 A1 | 12/2015 | Liu et al. | | |
| 2016/0295573 A1* | 10/2016 | Lee | ...................... | H04L 1/1812 |
| 2016/0295576 A1* | 10/2016 | Dinan | .................. | H04L 5/0053 |
| 2016/0338041 A1* | 11/2016 | Li | ........................ | H04L 5/0087 |
| 2017/0033912 A1 | 2/2017 | Onggosanusi et al. | | |
| 2017/0041923 A1* | 2/2017 | Park | ...................... | H04L 5/0053 |
| 2017/0215117 A1 | 7/2017 | Kwon et al. | | |
| 2017/0238330 A1 | 8/2017 | Jiang et al. | | |
| 2018/0007667 A1* | 1/2018 | You | ........................ | H04W 72/12 |
| 2018/0338339 A1* | 11/2018 | Song | ...................... | H04L 5/001 |
| 2018/0375619 A1* | 12/2018 | Hwang | ............. | H04W 72/0446 |
| 2019/0068268 A1* | 2/2019 | Zhang | ................ | H04B 7/0632 |
| 2019/0207737 A1* | 7/2019 | Babaei | ................ | H04L 27/2607 |
| 2019/0215897 A1* | 7/2019 | Babaei | .................. | H04W 76/28 |
| 2021/0100031 A1* | 4/2021 | Cirik | ................ | H04W 74/0833 |
| 2021/0105796 A1* | 4/2021 | Yang | ................ | H04W 72/1242 |
| 2021/0144582 A1* | 5/2021 | Yi | ...................... | H04W 28/0278 |

FOREIGN PATENT DOCUMENTS

| | | |
|---|---|---|
| CN | 101534518 A | 9/2009 |
| CN | 102595476 A | 7/2012 |
| WO | 2016019884 A1 | 2/2016 |
| WO | 2016163786 A1 | 10/2016 |

OTHER PUBLICATIONS

3GPP TS 36.212 V13.0.0, 3rd Generation Partnership Project; Technical Specification Group Radio Access Network; Evolved Universal Terrestrial Radio Access (E-UTRA); Multiplexing and channel coding (Release 13), Dec. 2015, 121 pages.

3GPP TS 36.213 V13.0.0, 3rd Generation Partnership Project; Technical Specification Group Radio Access Network; Evolved Universal Terrestrial Radio Access (E-UTRA); Physical layer procedures (Release 13), Dec. 2015, 326 pages.

3GPP TS 38.331 V0.0.2, 3rd Generation Partnership Project; Technical Specification Group Radio Access Network; NR; Radio Resource Control (RRC); Protocol specification (Release 15 ), Mar. 2017, 13 pages.

* cited by examiner

MEASUREMENT REPORTING METHOD AND APPARATUS

CROSS-REFERENCE TO RELATED APPLICATIONS

This application is a continuation of International Application No. PCT/CN2018/085758, filed on May 5, 2018, which claims priority to Chinese Patent Application No. 201710314213.5, filed on May 5, 2017. The disclosures of the aforementioned applications are hereby incorporated by reference in their entireties.

TECHNICAL FIELD

This application relates to communications technologies, and in particular, to a measurement reporting method and an apparatus.

BACKGROUND

In a long term evolution (LTE) system, to improve transmission performance of the LTE system, a terminal usually measures a channel state information (CSI) reference signal (RS) and feeds back channel state information to a base station.

With evolution of technologies, for example, development of a new radio (NR) technology, beams and beam measurement as well as more channel state information types are introduced.

To improve transmission performance of a wireless communications system, how a terminal reports a measurement result is a problem to be urgently resolved.

SUMMARY

Embodiments of this application provide an information reporting method and an apparatus, to improve performance of a wireless communications system.

According to a first aspect, an embodiment of this application provides a measurement reporting method, including: obtaining, by a terminal, values of a plurality of measurement reporting parameters; and sending, by the terminal, a value or values of some of the plurality of measurement reporting parameters to a base station, where the some measurement reporting parameters conform to reporting rules.

In an optional design, the values of the measurement reporting parameters may be obtained through measurement, or may be obtained through calculation after measurement.

In an optional design, the some measurement reporting parameters may be one measurement reporting parameter or multiple measurement reporting parameters.

In an optional design, the measurement reporting parameters may include one or more measurement reporting parameters associated with a spatial resource, for example, a spatial division feature.

In an optional design, the method further includes: receiving, by the terminal, the reporting rules. The reporting rules may be carried in higher layer signaling, for example, RRC (radio resource control) signaling, and then sent to the terminal.

In an optional design, the reporting rules may be specified in a communication standard.

In an optional design, the method further includes: receiving, by the terminal, a reporting setting, where the reporting setting includes the plurality of measurement reporting parameters. The reporting setting may be carried in a measurement setting, and then sent to the terminal. The measurement setting may be carried in RRC signaling, and then sent to the terminal.

In an optional design, the method further includes: receiving, by the terminal, a reporting activation indication associated with the plurality of measurement reporting parameters. The activation indication is used to activate a behavior of reporting a measurement reporting parameter. The reporting activation indication may be carried in a MAC-CE or DCI, and then sent to the terminal.

In an optional design, the method further includes: sending, by the terminal, a reporting capability of the terminal to the base station, where the plurality of measurement reporting parameters are associated with the reporting capability of the terminal. It can be understood that the terminal has a capability of measuring and reporting the plurality of measurement reporting parameters.

In an optional design, the obtaining, by a terminal, values of a plurality of measurement reporting parameters in the method includes: measuring, by the terminal, a pilot of the base station and obtaining the values of the plurality of measurement reporting parameters.

In an optional design, the sending, by the terminal, a value or values of some of the plurality of measurement reporting parameters to a base station in the method includes: if a reporting conflict occurs, sending, by the terminal, the value or values of the some measurement reporting parameters to the base station.

According to the method in the first aspect, the terminal may feed back a measurement result of a pilot on each spatial resource to the base station depending on a requirement, so that the base station adapts to data transmission scheduling and spatial resource management for each spatial resource, thereby improving performance of a wireless communications system. In addition, the method is simple and elegant during implementation, and is compatible with CSI measurement reporting.

According to a second aspect, an embodiment of this application provides a measurement reporting method, including: sending, by a base station, a pilot; and receiving, by the base station from a terminal, a value or values of some of a plurality of measurement reporting parameters that are associated with the pilot, where the some measurement reporting parameters conform to reporting rules.

In an optional design, the method further includes: sending, by the base station, the reporting rules to the terminal.

In an optional design, the method further includes: sending, by the base station, a reporting setting to the terminal, where the reporting setting includes the plurality of measurement reporting parameters.

In an optional design, the method further includes: sending, by the base station, a reporting activation indication associated with the plurality of measurement reporting parameters to the terminal.

In an optional design, the method further includes: receiving, by the base station, a reporting capability of the terminal, where the plurality of measurement reporting parameters are associated with the reporting capability of the terminal.

For various optional designs of the second aspect, refer to content of the first aspect.

According to the method in the second aspect, the base station can obtain a measurement result of a pilot on each spatial resource depending on a requirement and can adapt to data transmission scheduling and spatial resource management for each spatial resource based on the measurement result, thereby improving performance of a wireless communications system. In addition, the method is simple and elegant during implementation, and is compatible with CSI measurement reporting.

According to a third aspect, an embodiment of this application provides a communications apparatus that is configured to implement the method in the first aspect. The communications apparatus may be a terminal or a baseband chip.

In an optional design, the communications apparatus includes a processor and a transceiver component. The processor and the transceiver component may be configured to implement functions of the parts in the method in the first aspect. In this design, if the communications apparatus is a terminal, the transceiver component of the communications apparatus may be a transceiver; or if the communications apparatus is a baseband chip, the transceiver component of the communications apparatus may be an input/output circuit of the baseband chip.

In another optional design, the communications apparatus includes a processor. The processor is configured to run the following program, so as to implement the method in the first aspect. Optionally, the communications apparatus may further include a memory, where the memory is configured to store a program for implementing the method in the first aspect.

According to a fourth aspect, an embodiment of this application provides a communications apparatus that is configured to implement the method in the second aspect. The communications apparatus may be a base station, a baseband chip, or a baseband processing board.

In an optional design, the communications apparatus includes a processor and a transceiver component. The processor and the transceiver component may be configured to implement functions of the parts in the method in the second aspect. In this design, if the communications apparatus is a base station, the transceiver component of the communications apparatus may be a transceiver; or if the communications apparatus is a baseband chip or a baseband processing board, the transceiver component of the communications apparatus may be an input/output circuit of the baseband chip or the baseband processing board.

In another optional design, the communications apparatus includes a processor. The processor is configured to run the following program, so as to implement the method in the second aspect. Optionally, the communications apparatus may further include a memory, where the memory is configured to store a program for implementing the method in the second aspect.

According to a fifth aspect, an embodiment of this application further provides a computer program product, where the computer program product includes a program. When the program runs, the method in the first aspect or the second aspect is performed.

According to a sixth aspect, an embodiment of this application further provides a computer-readable storage medium in which a program is stored. When the program runs, the method in the first aspect or the second aspect is performed.

In the foregoing aspects, the reporting rules include at least one of the following: a first-type measurement reporting parameter has priority over a second-type measurement reporting parameter, where the first-type measurement reporting parameter includes: a receive beam index indication, a transmit beam index indication, or a reference signal resource index indication, and the second-type measurement reporting parameter includes: a rank indicator RI, a precoding matrix indicator PMI, or a channel quality indicator; and/or partial band measurement reporting has priority over subband measurement reporting; semi-persistent measurement reporting has priority over periodic measurement reporting; wideband measurement reporting has priority over subband measurement reporting; partial band measurement reporting has priority over wideband measurement reporting; aperiodic measurement reporting has priority over semi-persistent measurement reporting; aperiodic measurement reporting has priority over periodic measurement reporting; a reporting type involving a beam index indication has priority over a reporting type involving an RI; a reporting type involving a beam index indication has priority over a reporting type involving a PMI; a reporting type involving a beam index indication has priority over a reporting type involving a channel quality; a reporting setting with a smaller identifier has priority over a reporting setting with a larger identifier; and a serving cell with a smaller identifier has priority over a serving cell with a larger identifier.

In the foregoing aspects, the reporting types include at least one of the following: a beam index indication; a beam index indication and channel quality; channel quality; channel quality, a spatial division feature, and a corresponding beam index indication; a beam index indication and an RI; a beam index indication, an RI, and a PMI; an RI and a PMI; and channel quality and a PMI.

In technical solutions of this application, a measurement information reporting frame such as a reporting type or a reporting priority is designed, so that the terminal can report a measurement reporting parameter required by a network, thereby improving performance of the wireless communications system.

BRIEF DESCRIPTION OF THE DRAWINGS

To describe technical solutions of this application more clearly, the following briefly describes accompanying drawings required for describing embodiments.

DETAILED DESCRIPTION OF ILLUSTRATIVE EMBODIMENTS

Figure 1:
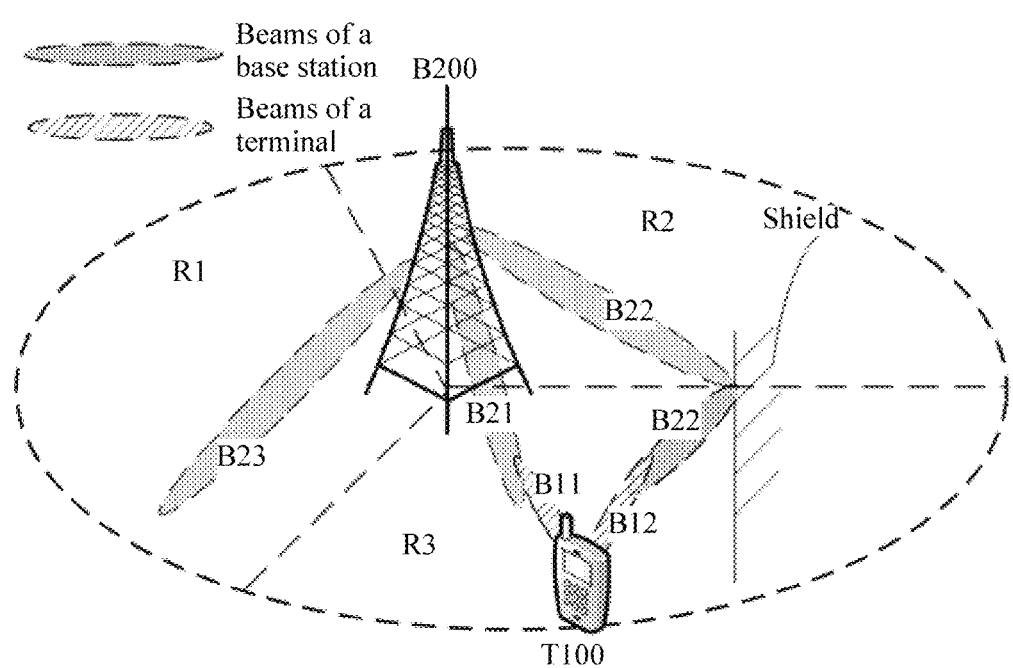
FIG. 1 is a simplified schematic diagram of a wireless communications system.

The following describes embodiments of this application with reference to accompanying drawings in this application.

The following describes some terms and stipulations in this application.

In this application, a communications apparatus is an apparatus having a communication function. For example, the communications apparatus may be a base station, a terminal, a baseband chip, a communications chip, or a sensing chip. Technical solutions of this application are applicable to different communications apparatuses. A base station and a terminal are mainly used as an example for description in the embodiments of this application.

In this application, the term "include" and variants thereof may mean to cover a non-restrictive inclusion; the term "or"

and variants thereof may mean "and/or"; the terms "associated", "related to", "corresponding to" and variants thereof may mean "binding", "bound to", "having a mapping relationship", "configured", "allocated", "based on", "obtained based on", and the like; the term "through" and variants thereof may mean "using", "by using", "upon", and the like; the terms "obtain", "determine", and variants thereof may mean "select", "query", "calculate", and the like; and the term "when" may mean "if", "under a condition that", or the like.

In this application, sometimes a field is also referred to as a field.

In this application, for example, content in brackets "0" may be used as an example, may be another expression, may be a description that can be omitted, or may be a further explanation and description.

In this application, ordinal numbers such as "first" and "second" are used to distinguish between different objects, but are not used to limit an order.

In this application, a signal is a representation form of information. Sometimes the signal may be referred to as a radio signal or a communications signal. In wireless communication, a signal can be sent from one communications node to another in a form of an electromagnetic wave. Signals may be of a plurality of types based on different information content. For example, a channel state information-reference signal (CSI-RS) may be classified as a reference signal. The reference signal may also be referred to as a pilot. The technical solutions of this application are described mainly by using a CSI-RS as an example. Persons skilled in the art should know that the technical solutions of this application may be further applied to measurement reporting performed on another reference channel.

In this application, a pilot may also be referred to as a pilot signal.

In this application, a beam is a communication resource. The beam may be a wide beam, a narrow beam, or a beam of another type. A technology used to form a beam may be a beamforming technology or another technical means. The beamforming technology may be specifically a digital beamforming technology, an analog beamforming technology, or a hybrid digital/analog beamforming technology. Beamforming may also be referred to as beam forming. Different beams may be considered as different resources. Different beams can be used to send same information or different information. Beams can be classified into a receive beam and a transmit beam. As an optional understanding, a transmit beam may indicate signal strength distribution formed in different spatial directions after signals are transmitted through an antenna, and a receive beam may indicate signal strength distribution of radio signals, received from the antenna, in different spatial directions. A beam may have different names. For example, the beam may be referred to as a spatial resource, a spatial weight, a spatial direction, or a spatial orientation. With development of technologies, a beam may have different names at different stages and in different scenarios. This is not limited in this application.

In this application, a communication resource used for receiving a signal may be referred to as a receive resource, and a communication resource used for transmitting a signal may be referred to as a transmit resource. For example, a receive beam is a receive resource and a transmit beam is a transmit resource.

In this application, a receive resource and a transmit resource may be considered as a resource pair. For example, a receive beam and a transmit beam may constitute a beam pair.

In this application, a path space for radio signal transmission may be referred to as a link. A path space for radio signal transmission using a resource pair may be referred to as a resource pair link. For example, a path space for signal transmission using a beam pair may be referred to as a beam pair link (BPL). The beam pair link may be indicated by using a logical number that can be used to indicate a receive beam, a transmit beam, or a transmit beam and a receive beam. For content related to the beam pair link, refer to related content of the proposal R1-1700748 in the third generation partnership project (3GPP).

In this application, a communication characteristic is a type of information used to indicate a transmission characteristic. For example, the communication characteristic may include an average gain, an average delay, delay distribution, a Doppler shift, or Doppler distribution.

In this application, sometimes reporting is also referred to as a feedback.

In this application, a measurement reporting parameter may also be referred to as a reporting parameter, a pilot reporting parameter, a measurement amount, a reporting amount, a measurement reporting amount, measurement reporting content, reporting content, or the like.

In this application, a measurement reporting type may also be referred to as a reporting format, a measurement reporting format, or the like.

In this application, a measurement reporting rule may also be referred to as a reporting rule, a pilot reporting rule, a priority rule, a reporting priority rule, or the like.

In this application, a quasi co-location (QCL) relationship is used to indicate that a plurality of resources have one or more identical or similar communication characteristics. For a plurality of resources that have a quasi co-location relationship, an identical or similar communication configuration may be used. For example, for two beams that have a QCL relationship, it may be considered that their beam pair links are identical or similar, and identical or similar power control may be used. For content related to QCL, refer to related content of the proposals R1-167970, R1-168436, R1-1610825, R1-1610520, R1-1613719, and R1-1613108 in 3GPP, as well as the 3GPP standards, for example, the section 6.2.1 of TS 36.211 v13.0.0 and the sections 7.1.9 and 7.1.10 of TS 36.213 v14.1.0.

The technical solutions of this application are applicable to communication between different network nodes. For example, the technical solutions are applicable to communication between a base station and a terminal, communication between base stations, or communication between terminals. Communication between a base station and a terminal is mainly used as an example for description in the embodiments of this application.

The technical solutions of this application may be applied to a wireless communications system shown in FIG. 1. In the wireless communications system shown in FIG. 1, beams formed by using the beamforming technology can be used to achieve long-distance signal coverage. The beamforming technology is mainly used for a high-frequency resource, and may also be used for a low-frequency resource. As shown in FIG. 1, the wireless communications system includes a base station B200 and a terminal T100. As shown in FIG. 1, by using the beamforming technology, the base station B200 can make high-frequency signals form signal coverage similar to narrow beam shapes that is referred to as narrow beams for short, for example, B21, B22, and B23. Narrow beams are also directional. Compared with a coverage range of wide beams, a coverage range of narrow beams is narrower. The base station may transmit one narrow beam or a plurality of different narrow beams at a same moment for communication. Quantities and directions of narrow beams transmitted by the base station at different moments may be different. For example, the base station B200 transmits the beams B21 and B22 at a moment T1, and transmits the beam B23 at a moment T2. The base station may use one or more narrow beams to communicate with the terminal at a same moment. For example, the base station B200 may send a communications signal to the terminal T100 by using B21 and B22 (for example, B22 is reflected after B22 encounters a shield but the communications signal can still be received by the terminal T100). For the terminal T100, beams B11 and B12 may also be used to send a communications signal to the base station B200. Different narrow beams may be used to send different information, or may be used to send same information. The wireless communications system may be a 4G communications system such as an LTE (long term evolution) system, a 5G communications system such as an NR system, or a communications system integrating a plurality of communications technologies (for example, a communications system integrating an LTE technology and an NR technology).

The terminal T100 is a device having a wireless communication function, and may be a handheld device, a vehicle-mounted device, a wearable device, or a computing device that has a wireless communication function, another processing device connected to a wireless modem, or the like. The terminal in different networks may have different names, for example, user equipment, a mobile station, a subscriber unit, a station, a cellular phone, a personal digital assistant, a wireless modem, a wireless communications device, a handheld device, a laptop computer, a cordless telephone set, and a wireless local loop station.

Figure 2:
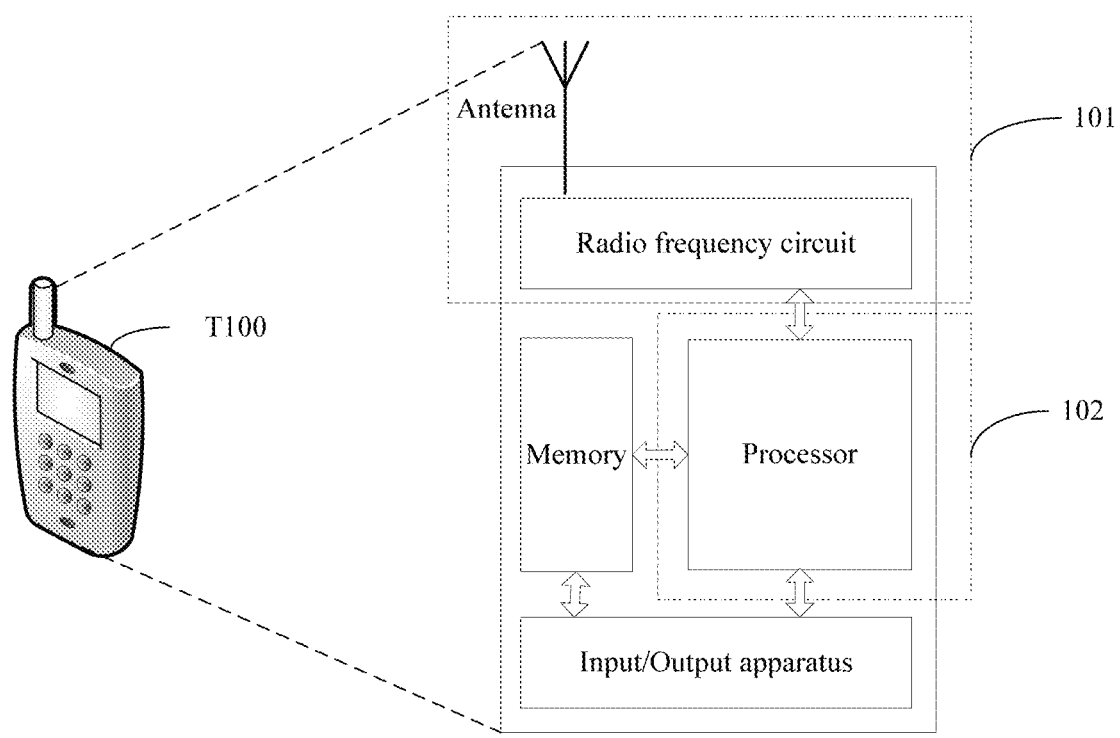
FIG. 2 is a simplified schematic structural diagram of a terminal.

A schematic structural diagram of the terminal T100 may be shown in FIG. 2. For ease of description, FIG. 2 shows only main components of the terminal. As shown in FIG. 2, the terminal T100 includes a processor, a memory, a radio frequency circuit, an antenna, and an input/output apparatus. The processor is mainly configured to process a communication protocol and communications data, control the terminal, execute a software program, process data of the software program, and the like. The memory is mainly configured to store the software program and data. The radio frequency circuit is mainly configured to perform conversion between a baseband signal and a radio frequency signal and process the radio frequency signal. The antenna is mainly configured to receive and send radio frequency signals in a form of an electromagnetic wave. The input/output apparatus such as a touchscreen, a display screen, or a keyboard is mainly configured to receive data entered by a user and output data to the user. Some types of terminals do not have an input/output apparatus.

When the terminal is powered on, the processor can read the software program (an instruction) in the storage unit, interpret and execute the instruction of the software program, and process the data of the software program. When data needs to be sent, the processor performs baseband processing on the to-be-sent data, and outputs a baseband signal to the radio frequency circuit. The radio frequency circuit performs radio frequency processing on the baseband signal, and sends a radio frequency signal through the antenna in a form of an electromagnetic wave. When data is sent to the terminal, the radio frequency circuit receives a radio frequency signal through the antenna, converts the radio frequency signal into a baseband signal, and outputs the baseband signal to the processor. The processor converts the baseband signal into data and processes the data.

For ease of description, FIG. 2 shows only one memory and one processor. There may be a plurality of processors and a plurality of memories in actual user equipment. A memory may also be referred to as a storage medium, a storage device, or the like. This is not limited in this embodiment of this application.

In an optional implementation, the processor may include a baseband processor and/or a central processing unit. The baseband processor is mainly configured to process a communication protocol and communications data. The central processing unit is mainly configured to control the entire terminal, execute a software program, and process data of the software program. The processor in FIG. 2 integrates functions of the baseband processor and the central processing unit. Persons skilled in the art can understand that, the baseband processor and the central processing unit may also be separate processors and are interconnected by using a bus or another technology. Optionally, the terminal may include a plurality of baseband processors to adapt to different network RATs. Optionally, the terminal may include a plurality of central processing units to enhance processing capability of the terminal. Optionally, functions of the baseband processor and the central processing unit may be integrated into one processor for implementation. Optionally, all parts of the terminal may be connected by using various buses. The baseband processor may be alternatively represented as a baseband processing circuit or a baseband processing chip. The central processing unit may be alternatively represented as a central processing circuit or a central processing chip. Optionally, a function of processing a communication protocol and communications data may be built in the processor or stored in the storage unit in a form of a software program. The processor executes the software program to implement a baseband processing function.

In this embodiment of this application, an antenna that has a transceiving function and a radio frequency circuit may be considered as a transceiver unit of the terminal, and a processor having a processing function may be considered as a processing unit of the terminal. As shown in FIG. 2, the terminal T100 includes a transceiver unit 101 and a processing unit 102. The transceiver unit may also be referred to as a transceiver, a transceiver apparatus, or the like. The processing unit may also be referred to as a processor, a processing board, a processing module, a processing apparatus, or the like. Optionally, a component, in the transceiver unit 101, configured to implement a receiving function may be considered as a receiving unit, and a component, in the transceiver unit 101, configured to implement a sending function may be considered as a sending unit. In other words, the transceiver unit 101 includes a receiving unit and a sending unit. The receiving unit may also be referred to as a receiver, a receiving circuit, or the like. The sending unit may also be referred to as a transmitter, a transmitting circuit, or the like.

The base station B200 may also be referred to as a base station device, and is a device deployed in a radio access network to provide a wireless communication function. For example, a base station in an LTE network is referred to as an evolved NodeB (eNB, or eNodeB), a base station in an NR network is referred to as a TRP (transmission reception point) or a gNB (next-generation NodeB). A structure of the base station B200 may be shown in FIG. 3. The base station B200 shown in FIG. 3 may be a distributed base station, for example, a distributed base station including antennas, a remote radio unit (RRU), and a baseband unit (BBU) shown on the left in FIG. 3. The base station shown in FIG. 3 may be alternatively an integrated base station, for example, a small cell shown on the right in FIG. 3. The base station usually includes a part 201 and a part 202. The part 201 is mainly configured to receive and send radio frequency signals and perform conversion between a radio frequency signal and a baseband signal. The part 202 is mainly configured to perform baseband processing, control the base station, and the like. The part 201 may usually be referred to as a transceiver unit, a transceiver, a transceiver circuit, or the like. The part 202 may usually be referred to as a processing unit. The part 202 may usually be a control center of the base station.

In an optional implementation, the part 201 may include antennas and a radio frequency unit, where the radio frequency unit is mainly configured to perform radio frequency processing. Optionally, a component, in the part 201, configured to implement a receiving function may be considered as a receiving unit, and a component, in the part 201, configured to implement a sending function may be considered as a sending unit. In other words, the part 201 includes a receiving unit and a sending unit. For example, the receiving unit may also be referred to as a receiver or a receiving circuit, and the sending unit may also be referred to as a transmitter or a transmitting circuit.

In an optional implementation, the part 202 may include one or more boards, and each board may include a processor and a memory. The processor is configured to read and execute a program in the memory, to implement a baseband processing function and control the base station. If there are a plurality of boards, the boards may be interconnected to enhance a processing capability.

In another optional implementation, with development of a system-on-chip (SoC for short) technology, some or all functions of the part 202 and the part 201 may be implemented by the SoC technology, for example, implemented by a base station functional chip. The base station functional chip integrates components such as a processor, a memory, and an antenna interface. A program for a base station-related function is stored in the memory, and is executed by the processor to implement the base station-related function. Optionally, the base station functional chip can also access a memory outside the chip to implement the base station-related function.

Figure 3:
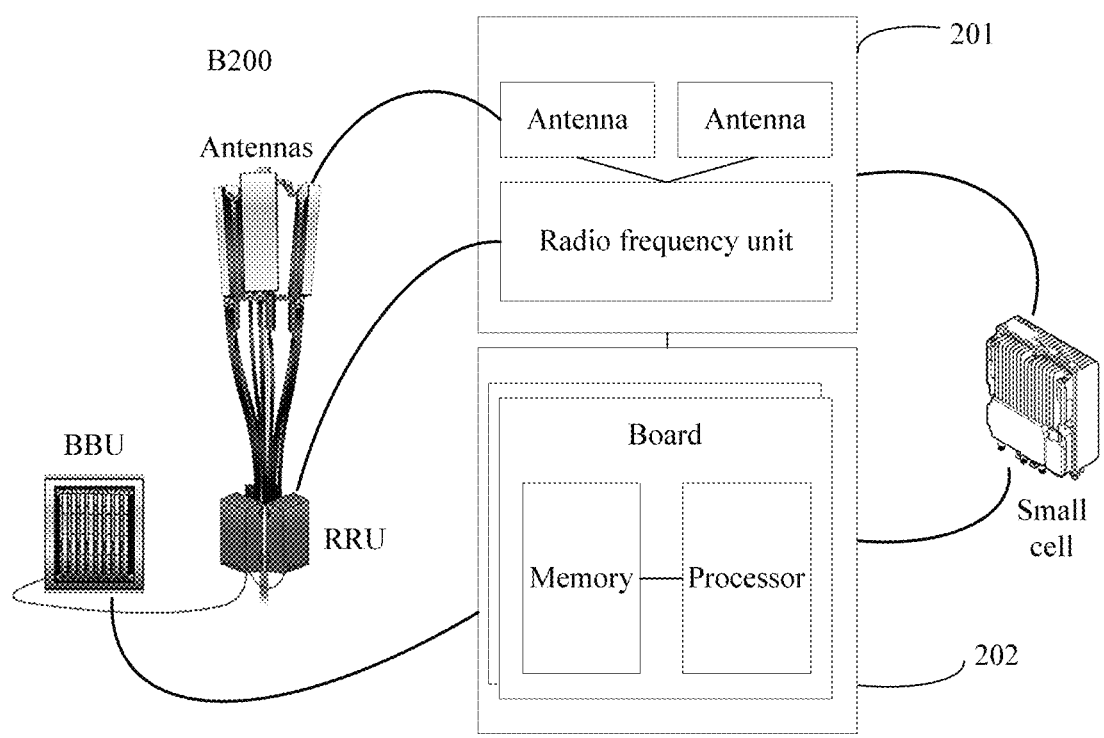
FIG. 3 is a simplified schematic structural diagram of a base station.

The foregoing descriptions about a terminal and a base station that are used as examples in FIG. 2 and FIG. 3 are applicable to the terminal and the base station in this application.

For ease of description, in this application, reference signal measurement, also known as measurement of a pilot, is referred to as pilot measurement for short; measurement reporting of a reference signal, also known as measurement reporting of a pilot, is referred to as pilot measurement reporting or measurement reporting for short; and a reporting setting of pilot measurement is referred to as a reporting setting for short.

In the foregoing wireless communications system, pilot measurement reporting may be classified into aperiodic measurement reporting, periodic measurement reporting, and semi-persistent measurement reporting in terms of time domain.

The aperiodic measurement reporting is triggered dynamically. A measurement reporting parameter is configured by using a higher layer, for example, a radio resource control (RRC) layer. Reporting of the measurement reporting parameter is dynamically activated by using a MAC-CE (media access control control element) or DCI (downlink control information). For example, during movement of a user, when the base station detects relatively poor signal quality of a current link, the base station dynamically triggers the user to perform measurement and reporting on a neighboring cell.

The periodic measurement reporting means that a measurement reporting parameter is periodically reported at a specific time interval. The measurement reporting parameter and a reporting period are configured by using a higher layer (for example, an RRC layer). For example, after accessing the base station, a user receives a measurement setting sent by the base station, where the measurement setting includes the measurement reporting parameter that needs to be periodically reported. The terminal periodically reports a value of the measurement reporting parameter according to the reporting period.

The semi-persistent measurement reporting means that measurement reporting may be dynamically activated and deactivated. A measurement reporting parameter and a reporting period are configured by using a higher layer (for example, an RRC layer). Reporting of the measurement reporting parameter is dynamically activated or deactivated by using a MAC-CE or DCI. When the reporting is activated, the measurement reporting is similar to periodic measurement reporting; when the reporting is deactivated, the measurement reporting parameter does not need to be reported.

In the foregoing wireless communications system, pilot measurement reporting may be classified into wideband measurement reporting, partial band measurement reporting, and subband measurement reporting in terms of frequency domain.

The wideband measurement reporting is measurement reporting performed for a whole operating frequency band of a serving base station. For example, a current operating frequency band is 10 MHz, and a user needs to measure and combine pilots of a wide band, and report a value of a measurement reporting parameter for the wide band.

The partial band measurement reporting is measurement reporting performed for a part of an operating frequency band of a serving base station. For example, the serving base station can support services of different service types that occupy a partial band of the whole operating frequency band. Only a value of a measurement reporting parameter needs to be reported for the partial band based on a current service type of a user.

The subband measurement reporting means that a whole operating frequency band of a serving base station is divided into a plurality of subbands, and the base station or a user side selects a value of a measurement reporting parameter that is to be reported for one or more subbands.

A higher antenna array gain can be achieved by using beams for transmission in the foregoing wireless communications system. In a process of using beams for communication, beam management is required, such as selection of a beam with desirable communication quality, establishment of a communication link for a beam, and optimization of a selected beam to provide a communication channel capacity. Pilot measurement may be performed to achieve effective beam management. For example, the base station sends pilots by using different beams (which can be simply understood as sending pilots in different directions), and the terminal measures pilots on different beams to obtain measurement results of the pilots on the beams, and feeds back the measurement results to the base station for beam management. The pilots sent by using different beams may be CSI-RSs.

Pilot measurement reporting may be used for both beam management and link adaptive scheduling. In an optional design, the measurement reporting parameter reported by the terminal may include one or more of the following.

(1) A receive beam indication is used to indicate a user-side or base station-side receive beam index or number. The receive beam indication may indicate one or more receive beams. The receive beam indication may be indicated by using a logical identifier, where the logical identifier may identify a single beam or a group of beams. For example, the logical identifier may be an identifier of a beam. When the logical identifier is used to identify a group of beams, the logical identifier may be considered as a group identifier, for example, an identifier of a receive beam set or an identifier of a receive antenna group. The group identifier may usually be a BPL identifier or a QCL identifier. Generally, identifiers in one group have one or more identical or similar communication characteristics or spatial characteristics. The receive beam indication may also be referred to as a receive beam index indication, which is a type of beam index indication.

(2) A transmit beam indication is used to indicate a user-side or base station-side transmit beam index or number. The transmit beam indication may indicate one or more transmit beams. Similar to the receive beam indication, the transmit beam indication may be indicated by using a logical identifier. For related content, refer to content related to the receive beam indication. In another optional implementation, the transmit beam indication may be alternatively identified by using a resource identifier of a reference signal or an antenna port number. For example, a CSI-RS resource identifier or an antenna port number is used to identify a transmit beam, or a combination of a CSI-RS resource identifier and an antenna port number is used to identify a transmit beam. The transmit beam indication may also be referred to as a transmit beam index indication, which is a type of beam index indication.

(3) Beam quality is used to indicate quality of a beam. Beam quality may be indicated by using reference signal received power, for example, L1 CSI-RS reference signal received power (L1 CSI-RS RSRP), namely, linear average power of a CSI-RS measured at an antenna connection of the terminal, in watts [W].

(4) A spatial division feature (spatial parameters) is used to indicate a spatial characteristic of a transmission channel between a base station and a user. For example, a mean zenith angle of arrival or a mean angle of arrival can be understood as a spatial division feature.

(5) A resource selection indicator (RSI) is used to indicate a pilot resource set, a pilot resource, a pilot port, or pilot resource beam information corresponding to current measurement reporting. For example, for the resource selection indicator, refer to a channel state information-reference signal resource indicator (CRI) in LTE.

(6) A rank indicator (RI) is used to indicate a quantity of transport layers available to a current user.

(7) A precoding matrix indicator (PMI) is used to indicate precoding information available to a current user. For example, for downlink transmission, when the base station has only one antenna panel, the PMI may be divided into two parts: One is precoding information indicative of long-term channel quality or beam selection (which may be denoted as W1), and the other is precoding information indicative of short-term/instantaneous channel quality (which may be denoted as W2). When a plurality of antenna panels are used in the base station, the PMI may be divided into three parts: W1, W2, and a phase difference (co-phasing factor) of bands or subbands among the plurality of antenna panels (which may be denoted as W3). W3 may be reported separately, or may be built into W1 or W2 and then reported together with W1 or W2. Sometimes, W1 is also referred to as a first PMI, and W2 is also referred to as a second PMI.

(8) Channel quality (CQ) is used to indicate channel quality of a current user. For example, for the channel quality, refer to a channel quality indicator (CQI) in LTE. Channel quality may be quantized as a level indicator of a modulation and coding scheme (MCS).

(9) Precoding (feedback) based on a linear combination codebook is used to indicate final precoding information. For example, for a two-level codebook feedback, W1 is used to feed back indications of a plurality of selected beams, and W2 is used to indicate one or more groups of weight vectors of the plurality of selected beams mentioned in W1. The final precoding information can be jointly indicated by using the two parts.

(10) A covariance matrix (feedback) is used to indicate a long-term wideband channel covariance matrix.

(11) Hybrid CSI (feedback) is used to indicate a joint feedback of precoding based on a linear combination codebook and beamformed CSI-RS measurement.

(12) An interference amount (feedback) is used to indicate an amount of interference between matched users in a cell, between cells, or between beams.

The network side may deliver a measurement setting to the terminal for reference signal (pilot) measurement. For example, the measurement setting may include one or more links that are corresponding to a reporting setting and a resource setting. Each resource setting includes one or more resource sets. Each resource set further includes one or more pilot (for example, CSI-RS) resources. Each pilot resource is corresponding to one resource index that is used to uniquely identify the pilot resource. The measurement setting may be used for beam measurement, and may also be used for pilot measurement. Measurement reporting parameters to be reported by the terminal vary according to different measurement requirements. For example, for P2 beam scanning, a transmit beam indication needs to be reported, and for P3 beam scanning, a receive beam indication needs to be reported. Therefore, specific measurement reporting parameters to be reported by the terminal vary according to different network application scenarios or beam scanning modes. The measurement setting may be used for beam management and link adaptive scheduling.

In this application, an index can be understood as an identifier, and an index may also be referred to as a number.

It can be simply understood that the resource setting indicates specific resources (such as frequency domain resources, time domain resources, or spatial resources) on which a reference signal (pilot) is transmitted; the reporting setting indicates a measurement reporting parameter to be reported; and the link indicates an association relationship between a measurement resource setting and a measurement reporting setting. By using the measurement setting, the terminal can know specific measurement reporting parameters that need to be obtained to measure a reference signal transmitted on specific resources, a manner of obtaining values of these measurement reporting parameters, and a specific reporting manner.

The following provides a description of a method for configuring measurement reporting parameters to be reported by a terminal. A base station and a terminal in FIG. 4 may be the base station and the terminal in FIG. 2 and FIG. 3. A network scenario in FIG. 4 may be shown in FIG. 1.

Figure 4:
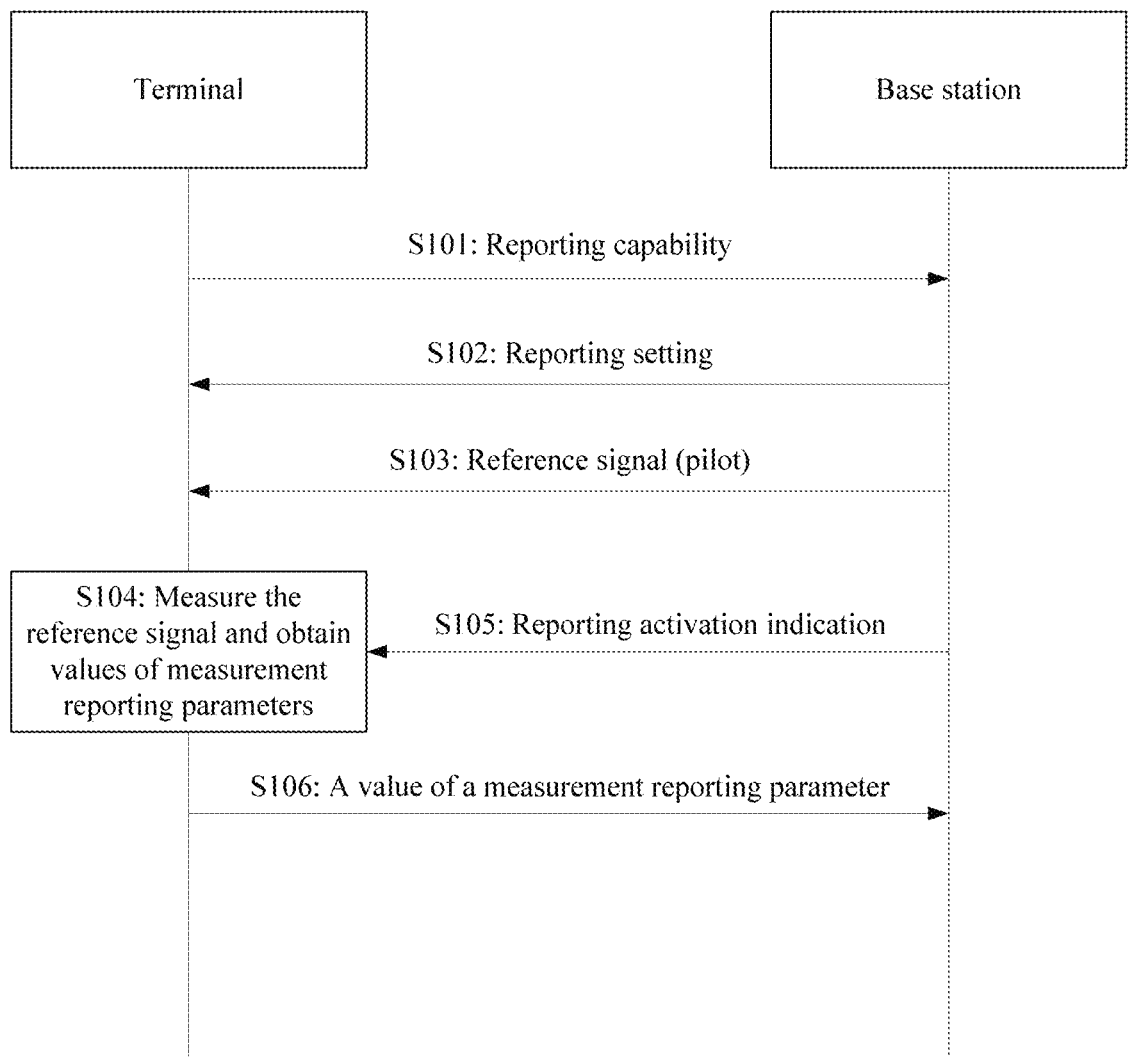
FIG. 4 is a diagram of signaling exchange in a measurement reporting method.

As shown in FIG. 4, Slot and S102 include the following content.

S101: The terminal sends a reporting capability to the base station.

The sending function may be implemented by a transceiver of the terminal.

In other words, the base station receives the reporting capability from the terminal. The receiving function may be implemented by a transceiver of the base station.

The reporting capability can be understood as a measurement capability or a measurement reporting capability. For example, the reporting capability includes: a maximum operating band that can be supported by the terminal and a quantity of receive antennas of the terminal.

Optionally, the terminal may send information about the measurement capability to the base station by using RRC signaling or physical layer signaling.

S102: The base station sends a measurement setting that includes one or more reporting settings to the terminal.

The sending function may be implemented by the transceiver of the base station.

In other words, in the S102, the terminal receives the measurement setting from the base station. The receiving function may be implemented by the transceiver of the terminal.

The reporting setting is included in a measurement setting message. Each reporting setting includes one or more of the following information: an index of the reporting setting used to uniquely identify the reporting setting; a time domain characteristic of pilot measurement reporting (for example, periodic, aperiodic, and semi-persistent); a frequency domain granularity of pilot measurement and reporting (for example, a subband feedback decided by the terminal, a subband feedback configured by the base station, a wideband feedback, and a partial band feedback); measurement reporting content (for example, a PMI, an RI, a CQI, and a CRI); and information for indicating a beam scanning method. Optionally, the measurement setting may further include a measurement limit and a codebook setting. If the reporting is periodic, each reporting setting further includes a reporting period and a reporting time offset that are corresponding to a reporting amount.

In this application, it may be considered that the measurement reporting parameter is included in the measurement setting, or that the measurement reporting parameter is included in the reporting setting.

The measurement limit is configured specific to the reporting setting to notify a user of a current measurement behavior. For example, the measurement limit is used to indicate whether a final measurement result is based on a measurement result of a single sampling point or an average measurement result over a period of time. The codebook setting is used to indicate a codebook set index that needs to be used for PMI reporting. The time domain characteristic is configured specific to the reporting setting and is applicable to all measurement reporting parameters included in the reporting setting. A frequency domain characteristic is configured specific to a measurement reporting parameter. For example, the frequency domain characteristic may be configured specific to the measurement reporting parameters (3), (4), (7), (8), (9), (10), (11), and (12).

Optionally, the measurement setting may be sent to the terminal by using higher layer signaling. For example, the higher layer signaling may be radio resource control (RRC) signaling.

In an optional design, after receiving the measurement setting, the terminal may perform measurement based on the measurement setting, as shown in S103 and S104 in FIG. 4.

S103: The base station sends a reference signal (pilot).

The sending function in S103 may be implemented by the transceiver of the base station.

S104: The terminal measures the reference signal and obtains values of a plurality of measurement reporting parameters.

The measurement and obtaining functions in S104 may be implemented by a processor and the transceiver of the terminal.

In another optional design, after receiving the measurement setting, the terminal does not immediately perform measurement reporting based on the measurement setting, but needs to wait for a reporting activation indication sent by the base station, to determine whether to enable reporting of the measurement reporting parameter in the measurement setting.

For example, after sending the measurement setting to the terminal, the base station may send a reporting activation indication to the terminal based on a function of a reference signal, a current transmission mode, an application scenario, or a beam scanning mode, to activate the reporting measurement parameter to be reported by the terminal, that is, to activate a behavior of reporting the measurement reporting parameter by the terminal, as shown in S105 in FIG. 4.

S105: The base station sends a reporting activation indication to the terminal.

The sending function in S105 may be implemented by the transceiver of the base station.

In other words, the terminal receives the reporting activation indication from the base station. The receiving function may be implemented by the transceiver of the terminal.

The reporting activation indication may be considered as enabling or disabling reporting of the measurement reporting parameters. For example, if the measurement setting indicates that a measurement reporting parameter 1, a measurement reporting parameter 2, and a measurement reporting parameter 3 need to be reported, and the reporting activation indication may indicate that the measurement reporting parameters 1 and 2 are to be activated, the terminal reports the measurement reporting parameters 1 and 2 based on the measurement setting, but does not report the measurement reporting parameter 3.

Optionally, the base station may send the reporting activation indication to the terminal by using RRC signaling, a MAC-CE, or DCI.

It can be understood that the measurement setting or the reporting setting in the S102 may also be considered as a reporting activation indication. In this case, the S105 does not need to be performed.

In an optional implementation, when the function of the reference signal, the current transmission mode, the application scenario, or the beam scanning mode changes, the base station may perform S105 again to change the measurement reporting parameters of the terminal. For example, some activated measurement reporting parameters may be disabled, or some new measurement reporting parameters may be enabled. "Disabled" may be considered as "deactivated", and "enabled" may be considered as "activated".

Then, the terminal may report the measurement reporting parameters based on the reporting setting. An example is provided as follows:

S106: The terminal sends a value of a measurement reporting parameter to the base station.

The sending function in S106 may be implemented by the transceiver of the terminal.

In other words, the base station receives the value of the measurement reporting parameter from the terminal. The receiving function may be implemented by the transceiver of the base station.

The terminal may send the value of the measurement reporting parameter to the base station based on the reporting setting.

In an optional design, the terminal may report a measurement reporting parameter based on the measurement reporting parameter and a reporting period or a reporting time offset corresponding to the measurement reporting parameter. For example, the terminal can know, based on the measurement setting, that CQ, a PMI, a receive beam indication, and beam quality need to be reported in a $K^{th}$ subframe. In this case, the terminal may report the CQ, the PMI, the receive beam indication, and the beam quality in the $K^{th}$ subframe.

In an optional design, a manner of reporting a measurement reporting parameter may be stipulated. For example, a measurement reporting type, referred to as a reporting type for short, may be stipulated. When reporting a measurement reporting parameter, the terminal needs to perform reporting based on a measurement reporting parameter stipulated in the reporting type. For example, the terminal can know, based on the measurement setting, that CQ, a PMI, a receive beam indication, and beam quality need to be reported in a $K^{th}$ subframe. If there is a measurement reporting type X, the measurement reporting type X indicates that the terminal may simultaneously report the CQ, the PMI, and the beam quality within one subframe, and there is no measurement reporting type indicating that the terminal may simultaneously report the CQ, the PMI, the beam quality, and the receive beam indication within one subframe. In this case, the terminal reports the CQ, the PMI, and the beam quality in the $K^{th}$ subframe based on the measurement reporting type X, but does not report the receive beam indication.

Optional designs of the reporting type are as follows.

A reporting type 1 is a beam index indication (beam indication). This reporting type is used to notify the base station of specific receive/transmit beams that are the best for the terminal, that conform to quality requirements, or that are available. The beam index indication may indicate one or more (for example, N) receive/transmit beams. The quantity N may be stipulated by a communication standard or notified by the base station by using signaling such as RRC signaling, a MAC-CE, or DCI. Alternatively, the terminal independently selects one or more (for example, N) receive/transmit beams.

A reporting type 2 is channel quality. This reporting type is used to notify the base station of channel quality or beam quality. In an optional implementation, the terminal selects a best beam pair (namely, a receive beam of the terminal and a best transmit beam of the base station that is received by the terminal), and reports channel quality of the beam pair. In another optional implementation, the base station configures a pilot resource for one or more (for example, N) beams, and the terminal side reports channel quality of the one or more (for example, N) beams based on an order of the configurations of the base station. The channel quality may be layer 1-reference signal received power (L1-RSRP), layer 1-reference signal received quality (L1-RSRQ), or a CQI.

A reporting type 3 is channel quality and a corresponding beam index indication. This reporting type is used to notify the base station of specific receive/transmit beams that are the best for the terminal, that conform to quality requirements, or that are available, and to notify the base station of corresponding channel quality. In an optional implementation, the terminal reports one or more (for example, N) beam indexes configured by the base station and channel quality corresponding to the foregoing beams. In an optional implementation, the terminal independently selects one or more (for example, N) receive/transmit beams, and reports an index indication and channel quality that are of the selected receive/transmit beam. Each beam index indication may be corresponding to channel quality of one or more beams. The channel quality may be one or more of the following parameters: L1-RSRP, L1-RSRQ, and a CQI.

A reporting type 4 is channel quality, a spatial division feature, and a corresponding beam index indication. This reporting type is used to notify the base station of specific receive/transmit beams that are the best for the terminal, that conform to quality requirements, or that are available, and to notify the base station of channel quality and a spatial characteristic that are corresponding to the foregoing beams. In an optional implementation, a best receive/transmit beam is selected, and an index indication, channel quality, and a spatial division feature that are of the receive/transmit beam are reported. In another optional implementation, the base station configures a pilot resource for one or more (for example, N) beams, and reports a beam index indication, channel quality, and a spatial division feature. Each beam index indication may be corresponding to channel quality and spatial division features of one or more beams based on an order of the configurations of the base station. In an optional implementation, the terminal independently selects one or more (for example, N) receive/transmit beams, and reports an index indication, corresponding beam quality, and a corresponding spatial division feature that are of the receive/transmit beam. Each receive/transmit beam index indication may be corresponding to channel quality and spatial division features of one or more beams.

A reporting type 5 is reporting of a beam index indication and an RI. This reporting type is used to notify the base station of specific receive/transmit beams that are the best/desirable/available for the terminal, and notify the base station of a corresponding quantity of transport layers. Specifically, in an optional implementation, a best transmit beam is selected, and an index indication and an RI that are of the receive/transmit beam are reported. In an optional implementation, the base station configures a pilot resource for one or more (for example, N) beams, and reports a beam index indication and an RI. In an optional implementation, the terminal independently selects one or more (for example, N) receive/transmit beams, and reports an index indication and an RI that are of the receive/transmit beam.

A reporting type 6 is reporting of a beam index indication, an RI, and a PMI. This reporting type is used to notify the base station of specific receive/transmit beams that are the best/desirable/available for the terminal, and notify the base station of a corresponding quantity of transport layers and a precoding matrix indicator. Specifically, in an optional implementation, a best transmit beam is selected, and an index indication, an RI, and a precoding matrix indicator that are of the receive/transmit beam are reported. In an optional implementation, the base station configures a pilot resource for one or more (for example, N) beams, and reports a beam index indication, an RI, and a precoding matrix indicator. In an optional implementation, the terminal independently selects one or more (for example, N) receive/transmit beams, and reports an index indication, an RI, and a precoding matrix indicator that are of the receive/transmit beam.

A reporting type 7 is reporting of an RI and a PMI. This reporting type is used to notify the base station of an optimal quantity of transport layers and an optimal precoding matrix indicator that are corresponding to a current channel for the terminal. Specifically, in an optional implementation, the base station configures a pilot resource for one or more (for example, N) beams, and reports an RI and a precoding matrix indicator based on the configurations of the base station. In an optional implementation, the terminal independently selects one or more (for example, N) receive/transmit beams, and reports an RI and a precoding matrix indicator.

A reporting type 8 is reporting of channel quality and a PMI. This reporting type is used to notify the base station of current channel quality and a precoding matrix indicator for the terminal. Specifically, in an optional implementation, the base station configures a pilot resource for one or more (for example, N) beams, and reports channel quality and a precoding matrix indicator based on the configurations of the base station. In an optional implementation, the terminal independently selects one or more (for example, N) receive/transmit beams, and reports channel quality and a precoding matrix indicator.

The beam index indication may be a receive beam index indication, may be a transmit beam index indication, or may be a transmit beam index indication and a receive beam index indication.

The beam index indication may be indicated by using a resource setting ID (identity), a resource set ID, a reference signal resource ID, or a port number ID; may be indicated by using a combination of a resource setting ID, a resource set ID, a reference signal resource ID, and a port number ID; or may be indicated by using a synchronization signal block time index (SS block time index, SS means Synchronization signal).

In this application, an ID may represent an identifier.

The receive beam index indication may be a receive beam set of the terminal, a receive beam of the terminal, a receive antenna group of the terminal, a receive antenna of the terminal, or a combination of a receive beam set and a receive antenna group.

The beam index indication may be a logical indication, for example, a BPL identifier, a QCL identifier, a tag identifier, or an indicator identifier. An identifier is corresponding to an explicit resource setting ID, a resource set ID, a reference signal resource ID, or a port number ID; is corresponding to a combination of a resource setting ID, a resource set ID, a reference signal resource ID, and a port number ID; or is corresponding to a synchronization signal block time index.

The terminal may need to simultaneously report a plurality of measurement reporting parameters to the base station based on the measurement setting. If there are no sufficient resources for reporting the measurement reporting parameters, or there is information redundancy in the plurality of measurement reporting parameters, it can be understood that a measurement reporting conflict occurs.

When a measurement reporting conflict occurs, the terminal may select, for reporting, some measurement reporting parameters from the plurality of measurement reporting parameters according to a reporting rule. In other words, the terminal sends a value or values of the some of the plurality of measurement reporting parameters to the base station, where the some measurement reporting parameters conform to the reporting rule. The some measurement reporting parameters may be one measurement reporting parameter or multiple measurement reporting parameters.

The reporting rule may be predefined in a protocol, or notified by the base station to UE by using signaling such as RRC signaling, a MAC-CE, or DCI.

In an optional design, the reporting rule may include one or more of the following rules.

Reporting rule 1: A reporting priority of aperiodic measurement reporting is higher than that of semi-persistent measurement reporting. In other words, aperiodic measurement reporting has priority over semi-persistent measurement reporting. For example, when the terminal can know, based on the measurement setting, that measurement reporting parameters corresponding to an aperiodic measurement reporting setting 1 and a semi-persistent measurement reporting setting 2 need to be reported in a $K^{th}$ subframe, the terminal preferentially reports a measurement reporting parameter corresponding to the aperiodic measurement reporting setting 1.

Reporting rule 2: Aperiodic measurement reporting has priority over periodic measurement reporting.

Reporting rule 3: Semi-persistent measurement reporting has priority over periodic measurement reporting. For example, when the terminal can know, based on the measurement setting, that measurement reporting parameters corresponding to a periodic measurement reporting setting 1 and a semi-persistent measurement reporting setting 2 need to be reported in a $K^{th}$ subframe, the terminal preferentially reports a measurement reporting parameter corresponding to the semi-persistent measurement reporting setting 2.

The foregoing reporting rules 1 to 3 may be considered as time domain reporting rules.

Reporting rule 4: A measurement reporting priority of wideband measurement reporting is higher than that of subband measurement reporting. In other words, wideband measurement reporting has priority over subband measurement reporting. For example, when the terminal can know, based on the measurement setting, that wideband channel quality and subband channel quality that is selected based on a user need to be reported in a $K^{th}$ subframe, the terminal preferentially reports the wideband channel quality. Measurement reporting parameters corresponding to the wideband channel quality and the subband channel quality that is selected based on a user may come from a same reporting setting, or may come from different reporting settings.

Reporting rule 5: A measurement reporting priority of partial band measurement reporting is higher than that of subband measurement reporting. In other words, partial band measurement reporting has priority over subband measurement reporting. For example, when the terminal can know, based on the measurement setting, that partial band channel quality and subband channel quality that is selected based on a user need to be reported in a $K^{th}$ subframe, the terminal preferentially reports the partial band channel quality. Measurement reporting parameters corresponding to the partial band channel quality and the subband channel quality that is selected based on a user may come from a same reporting setting, or may come from different reporting settings.

Reporting rule 6: A measurement reporting priority of partial band measurement reporting is higher than that of wideband measurement reporting. In other words, partial band measurement reporting has priority over wideband measurement reporting. For example, when the terminal can know, based on the measurement setting, that wideband channel quality and partial band channel quality need to be reported in a $K^{th}$ subframe, the terminal preferentially reports the partial band channel quality. Measurement reporting parameters corresponding to the wideband channel quality and the partial band channel quality may come from a same reporting setting, or may come from different reporting settings.

The foregoing reporting rules 4 to 6 may be considered as frequency domain reporting rules.

Reporting rule 7: A priority of a first-type measurement reporting parameter is higher than that of a second-type measurement reporting parameter. In other words, a first-type measurement reporting parameter has priority over a second-type measurement reporting parameter. For example, when the terminal can know, based on the measurement setting, that a receive beam index indication and an RI need to be reported in a $K^{th}$ subframe, the terminal preferentially reports the receive beam index indication. The measurement reporting parameters (1), (2), and (5) belong to the first-type measurement reporting parameter, and the measurement reporting parameters (3), (6), (7), and (8) belong to the second-type measurement reporting parameter.

Reporting rule 8: A priority of a second-type measurement reporting parameter is higher than that of a third-type measurement reporting parameter. In other words, a second-type measurement reporting parameter has priority over a third-type measurement reporting parameter. For example, the measurement reporting parameters (3), (6), (7), and (8) belong to the second-type measurement reporting parameter, and the measurement reporting parameters (4), (9), (11), and (12) belong to the third-type measurement reporting parameter.

The foregoing reporting rules 7 and 8 may be considered as reporting-content reporting rules.

Reporting rule 9: A reporting type involving a beam index indication has priority over a reporting type involving an RI. For example, when the terminal can know, based on the measurement setting, that the measurement reporting type 1 and the measurement reporting type 7 need to be reported in a $K^{th}$ subframe, the terminal preferentially reports the measurement reporting type 1. Measurement reporting parameters corresponding to the measurement reporting type 1 involving a beam index indication and the measurement reporting type 7 involving an RI may come from a same reporting setting, or may come from different reporting settings.

Reporting rule 10: A reporting type involving a beam index indication has priority over a reporting type involving a PMI. For example, when the terminal can know, based on the measurement setting, that the measurement reporting type 1 and the measurement reporting type 7 need to be reported in a $K^{th}$ subframe, the terminal reports only the measurement reporting type 1. Measurement reporting parameters corresponding to the measurement reporting type 1 and the measurement reporting type 7 may come from a same reporting setting, or may come from different reporting settings.

Reporting rule 11: A reporting type involving a beam index indication has priority over a reporting type involving a channel quality indicator. For example, when the terminal can know, based on the measurement setting, that the measurement reporting type 1 and the measurement reporting type 2 need to be reported in a $K^{th}$ subframe, the terminal reports only the measurement reporting type 1. Measurement reporting parameters corresponding to the measurement reporting type 1 and the measurement reporting type 2 may come from a same reporting setting, or may come from different reporting settings.

Reporting rule 12: A reporting type involving an RI has priority over a reporting type involving a PMI. For example, when the terminal can know, based on the measurement setting, that the measurement reporting type 7 and the measurement reporting type 8 need to be reported in a $K^{th}$ subframe, the terminal preferentially reports the measurement reporting type 7. Measurement reporting parameters corresponding to the measurement reporting type 7 involving an RI and the measurement reporting type 8 involving a PMI may come from a same reporting setting, or may come from different reporting settings.

Reporting rule 13: A reporting type involving a PMI has priority over a reporting type involving a channel quality indicator. For example, when the terminal can know, based on the measurement setting, that the measurement reporting type 8 and the measurement reporting type 2 need to be reported in a $K^{th}$ subframe, the terminal preferentially reports the measurement reporting type 8. Measurement reporting parameters corresponding to the measurement reporting type 8 and the measurement reporting type 2 may come from a same reporting setting, or may come from different reporting settings.

The foregoing reporting rules 9 to 13 may be considered as reporting-type reporting rules.

According to the reporting-type reporting rules, when uplink resources are limited, that is, when reporting resources cannot bear reporting overheads of some reporting types, priorities of reporting the foregoing reporting types are as follows: A reporting type with a lower priority and higher overheads can be rolled back to a reporting type with a higher priority and lower overheads. For example, the terminal needs to report the reporting type 6 (a beam index indication, an RI, and a PMI) at a current moment. However, the reporting resources cannot bear simultaneous reporting of all reporting amounts, the reporting type 6 is rolled back to the reporting type 5 involving only a beam index indication and an RI.

In an optional design, the terminal may stipulate reporting rules for a plurality of reporting settings based on reporting setting configuration information. The following provides examples.

Reporting rule 14: Measurement reporting parameters corresponding to a reporting setting with a smaller identifier ID have priority over those corresponding to a reporting setting with a larger identifier ID. For example, when the terminal can know, based on the measurement setting, that measurement reporting parameters corresponding to a reporting setting ID1 and a reporting setting ID2 need to be reported in a $K^{th}$ subframe, the terminal reports only measurement reporting parameters corresponding to the reporting setting ID1.

Reporting rule 15: Measurement reporting parameters corresponding to a serving cell with a smaller ID have priority over those corresponding to a serving cell with a larger ID. For example, when the terminal can know, based on the measurement setting, that measurement reporting parameters corresponding to a serving cell ID1 and a serving cell ID2 need to be reported in a $K^{th}$ subframe, the terminal reports only measurement reporting parameters corresponding to the serving cell ID1.

Based on the plurality of reporting rules, when several rules are all satisfied, a processing method needs to be stipulated for the several rules.

Optional processing method 1: First, processing is performed based on reporting time domain characteristics of a user; if priorities of the reporting time domain characteristics are the same, processing is performed based on reporting content; and if priorities of the report content are the same, processing is performed based on reporting types.

Optional processing method 2: After reporting rules are weighted and merged, a reporting priority of a measurement reporting parameter with a larger value is higher than that of a measurement reporting parameter with a smaller value. For example, a priority value=a×a time domain characteristic reporting rule+b×a frequency domain characteristic reporting rule+c×a reporting-content reporting rule+d×a reporting-type reporting rule+e×a configuration information reporting rule, where a, b, c, d, and e are greater than or equal to 0 and specific values of them may be configured by the base station, or may be stipulated in a protocol in advance. Different time domain characteristics, different frequency domain characteristics, different reporting content, different reporting types, and different configuration information may have a same value or different values. For example, periodic and semi-persistent time domain characteristics are 1, and an aperiodic time domain characteristic is 2. Specifically, it is assumed that two measurement reporting settings are configured for a user, a periodic measurement reporting setting 1 includes a reporting amount, that is, a receive beam index indication and wideband channel quality, and an aperiodic measurement reporting setting 2 includes a wideband PMI and a wideband RI. When measurement reporting parameters of the two reporting settings are reported at a same moment, priority values corresponding to the measurement reporting parameters are calculated as follows: a priority value of the reporting setting 1=a×a periodic weight+b×a wideband weight+c×a weight of first-type reporting content+d×a weight of a reporting type 3; and a priority value of the reporting setting 2=a×an aperiodic weight+b×a wideband weight+c×a weight of second-type reporting content+d×a weight of a reporting type 7. If the priority value of the reporting setting 1 is greater than that of the reporting setting 2, the terminal reports only measurement reporting parameters corresponding to the reporting setting 1. If the priority value of the reporting setting 2 is greater than that of the reporting setting 1, the terminal reports only measurement reporting parameters corresponding to the reporting setting 2.

In the foregoing method, the terminal may feed back a measurement result of a pilot on each spatial resource to the base station depending on a requirement, so that the base station adapts to data transmission scheduling and spatial resource management for each spatial resource, thereby improving performance of a wireless communications system. In addition, the method is simple and elegant during implementation, and is compatible with CSI measurement reporting.

The following provides general descriptions of a method corresponding to a terminal side in FIG. 4. For specific content, refer to the related description of actions performed by the terminal side in FIG. 4.

An embodiment of this application further provides a measurement reporting method, where the method includes: obtaining, by a terminal, values of a plurality of measurement reporting parameters; and sending, by the terminal, a value or values of some of the plurality of measurement reporting parameters to a base station, where the some measurement reporting parameters conform to reporting rules.

In an optional design, the values of the measurement reporting parameters may be obtained through measurement, or may be obtained through calculation after measurement.

In an optional design, the some measurement reporting parameters may be one measurement reporting parameter or multiple measurement reporting parameters.

In an optional design, the measurement reporting parameters may include one or more measurement reporting parameters associated with a spatial resource, for example, a spatial division feature.

In an optional design, the method further includes: receiving, by the terminal, the reporting rules. The reporting rules may be carried in higher layer signaling, for example, RRC signaling, and then sent to the terminal.

In an optional design, the reporting rules may be specified in a communication standard.

In an optional design, the method further includes: receiving, by the terminal, a reporting setting, where the reporting setting includes the plurality of measurement reporting parameters. The reporting setting may be carried in a measurement setting, and then sent to the terminal. The measurement setting may be carried in RRC signaling, and then sent to the terminal.

In an optional design, the method further includes: receiving, by the terminal, a reporting activation indication associated with the plurality of measurement reporting parameters. The activation indication is used to activate a behavior of reporting the measurement reporting parameters. The reporting activation indication may be carried in a MAC-CE or DCI, and then sent to the terminal.

In an optional design, the method further includes: sending, by the terminal, a reporting capability of the terminal to the base station, where the plurality of measurement reporting parameters are associated with the reporting capability of the terminal. It can be understood that the terminal has a capability of measuring and reporting the plurality of measurement reporting parameters.

In an optional design, the obtaining, by a terminal, values of a plurality of measurement reporting parameters in the method includes: measuring, by the terminal, a pilot of the base station and obtaining the values of the plurality of measurement reporting parameters.

In an optional design, the sending, by the terminal, a value or values of some of the plurality of measurement reporting parameters to a base station in the method includes: if a reporting conflict occurs, sending, by the terminal, the value or values of the some measurement reporting parameters to the base station.

The following provides general descriptions of a method corresponding to a base station side in FIG. 4. For specific content, refer to the related description of actions performed by the base station side in FIG. 4.

An embodiment of this application further provides a measurement reporting method, where the method includes: sending, by a base station, a pilot; and receiving, by the base station from a terminal, a value or values of some of a plurality of measurement reporting parameters that are associated with the pilot, where the some measurement reporting parameters conform to reporting rules.

For various optional designs of the method corresponding to the base station side, refer to the method corresponding to the terminal side. Details are not described herein.

An embodiment of this application further provides a communications apparatus, configured to implement the method corresponding to the terminal side in FIG. 4. The communications apparatus may be a terminal or a baseband chip. A structure of the terminal may be shown in FIG. 2.

In an optional design, the communications apparatus includes a processor and a transceiver component. The processor and the transceiver component may be configured to implement functions of the parts in the method corresponding to the terminal side. In this design, if the communications apparatus is a terminal, the transceiver component of the communications apparatus may be a transceiver; or if the communications apparatus is a baseband chip, the transceiver component of the communications apparatus may be an input/output circuit of the baseband chip.

In another optional design, the communications apparatus includes a processor. The processor is configured to run the foregoing program, so as to implement the method corresponding to the terminal side. Optionally, the communications apparatus may further include a memory, where the memory is configured to store a program for implementing the method corresponding to the terminal side.

An embodiment of this application further provides a communications apparatus, configured to implement the method corresponding to the base station side. The communications apparatus may be a base station, a baseband chip, or a baseband processing board.

In an optional design, the communications apparatus includes a processor and a transceiver component. The processor and the transceiver component may be configured to implement functions of the parts in the method corresponding to the base station side. In this design, if the communications apparatus is a base station, the transceiver component of the communications apparatus may be a transceiver; or if the communications apparatus is a baseband chip or a baseband processing board, the transceiver component of the communications apparatus may be an input/output circuit of the baseband chip or the baseband processing board.

In another optional design, the communications apparatus includes a processor. The processor is configured to run the foregoing program, so as to implement the method corresponding to the base station side. Optionally, the communications apparatus may further include a memory, where the memory is configured to store a program for implementing the method corresponding to the base station side.

An embodiment of this application further provides a computer program product, where the computer program product includes a program. When the program runs, the method corresponding to the terminal side or the base station side is performed.

An embodiment of this application further provides a computer-readable storage medium in which a program is stored. When the program runs, the method corresponding to the terminal side or the base station side is performed.

Persons skilled in the art should know that different optional parts/implementations may be combined or replaced depending on different network requirements.

In the several embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or at least two units are integrated into one unit. The integrated unit may be implemented in a form of hardware, or may be implemented in a form of hardware in addition to a software functional unit.

The foregoing software functional part may be stored in a storage unit. The storage unit includes several instructions for instructing a computer device (which may be a personal computer, a server, a network device, or the like) or a processor to perform some steps of the methods described in the embodiments of this application. The storage unit includes one or more memories, for example, a read-only memory (ROM), a random access memory (RAM), and an electrically erasable programmable read-only memory (EEPROM). The storage unit may be separate or may be integrated with the processor.

Persons skilled in the art can clearly understand that, for the purpose of convenient and brief description, division of the foregoing functional modules is merely used as an example for description. In actual application, the foregoing functions can be allocated to different functional modules for implementation depending on a requirement, that is, an inner structure of an apparatus is divided into different functional modules to implement all or some of the functions described above. For detailed working processes of the foregoing apparatuses, refer to corresponding processes in the foregoing method embodiments. Details are not described herein again.

Persons of ordinary skill in the art can understand that various numbers such as "first" and "second" in this specification are only used for differentiation for ease of description, but are not used to limit the scope of the embodiments of this application.

Persons of ordinary skill in the art can understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. In this application, a program may also be referred to as a computer instruction. When the computer program instruction is loaded and executed on a computer, the procedures or functions according to the embodiments of the present invention are all or partially generated. The computer may be a general-purpose computer, a dedicate computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Finally, it should be noted that the foregoing embodiments are merely intended to describe the technical solutions of this application, but not to limit this application. Although this application is described in detail with reference to the foregoing embodiments, persons of ordinary skill in the art should understand that they can still make modifications to the technical solutions described in the foregoing embodiments or make equivalent replacements to some or all technical features thereof, without departing from the scope of the technical solutions of the embodiments of this application.

What is claimed is:

1. A measurement reporting method, comprising:
obtaining, by a terminal, values of a plurality of measurement reporting parameters; and
sending, by the terminal a value or values of some of the plurality of measurement reporting parameters to a base station, wherein the some of the plurality of measurement reporting parameters conform to reporting rules, wherein the reporting rules comprise:
a reporting setting with a smaller identifier has priority over a reporting setting with a larger identifier;
a serving cell with a smaller identifier has priority over a serving cell with a larger identifier;
a reporting type involving a beam index indication has priority over a reporting type involving an RI a rank indicator (RI); and
aperiodic measurement reporting has priority over semi-persistent measurement reporting, or semi-persistent measurement reporting has priority over periodic measurement reporting.

2. The method according to claim 1, wherein the reporting type involving a beam index indication is a reporting type involving a beam index indication and beam quality; and
the some of the plurality of measurement reporting parameters conform to the reporting type involving the beam index indication and beam quality.

3. The method according to claim 2, wherein the some of the plurality of measurement reporting parameters belong to a first measurement reporting setting, and among the plurality of measurement reporting parameters, a measurement reporting parameter other than the some of the plurality of measurement reporting parameters belongs to a second measurement reporting setting; and
the method further comprises:
weighting and merging, by the terminal, the reporting rules to obtain a priority of the first measurement reporting setting and a priority of the second measurement reporting setting, wherein the first measurement reporting setting has priority over the second measurement reporting setting.

4. The method according to claim 3, further comprising:
determining that a reporting conflict has occurred, wherein the value or values of some of the plurality of measurement reporting parameters are sent after determining that
a reporting conflict has occurred.

5. A communications apparatus, comprising:
a processor;
a memory comprising a program to be executed in the processor, the processor when the program is executed is configured to perform operations of:
obtaining values of a plurality of measurement reporting parameters; and
sending a value or values of some of the plurality of measurement reporting parameters to a base station, wherein the some of the plurality of measurement reporting parameters conform to reporting rules, wherein the reporting rules comprise:
a reporting setting with a smaller identifier has priority over a reporting setting with a larger identifier;
a serving cell with a smaller identifier has priority over a serving cell with a larger identifier;
a reporting type involving a beam index indication has priority over a reporting type involving a rank indicator (RI); and
aperiodic measurement reporting has priority over semi-persistent measurement reporting, or semi-persistent measurement reporting has priority over periodic measurement reporting.

6. The apparatus according to claim 5, wherein the reporting type involving a beam index indication is a reporting type involving a beam index indication and beam quality; and
the some of the plurality of measurement reporting parameters conform to the reporting type involving the beam index indication and beam quality.

7. The apparatus according to claim 6, wherein the some of the plurality of measurement reporting parameters belong to a first measurement reporting setting, and among the plurality of measurement reporting parameters, a measurement reporting parameter other than the some of the plurality of measurement reporting parameters belongs to a second measurement reporting setting; and
the processor when the program is executed is further configured to perform operations of:
weighting and merging, the reporting rules to obtain a priority of the first measurement reporting setting and a priority of the second measurement reporting setting, wherein the first measurement reporting setting has priority over the second measurement reporting setting.

8. The apparatus according to claim 7, wherein the processor when the program is executed is configured to perform an operation of:
determining that a reporting conflict has occurred, wherein the value or values of some of the plurality of measurement reporting parameters are sent after determining that a reporting conflict has occurred.

9. A measurement reporting method, comprising:
sending, by a base station, a pilot; and
receiving, by the base station, from a terminal, a value or values of some of a plurality of measurement reporting parameters that are associated with the pilot, wherein the some of the plurality of measurement reporting parameters conform to reporting rules, wherein the reporting rules comprise:
a reporting setting with a smaller identifier has priority over a reporting setting with a larger identifier;
a serving cell with a smaller identifier has priority over a serving cell with a larger identifier;
a reporting type involving a beam index indication has priority over a reporting type involving a rank indicator (RI); and
aperiodic measurement reporting has priority over semi-persistent measurement reporting, or semi-persistent measurement reporting has priority over periodic measurement reporting.

10. The method according to claim 9, wherein the reporting type involving a beam index indication is a reporting type involving a beam index indication and beam quality; and the some of the plurality of measurement reporting parameters conform to the reporting type involving a beam index indication and beam quality.

11. The method according to claim 10, wherein the some of the plurality of measurement reporting parameters belong to a first measurement reporting setting, and among the plurality of measurement reporting parameters, a measurement reporting parameter other than the some of the plurality of measurement reporting parameters belongs to a second measurement reporting setting, wherein
the first measurement reporting setting has priority over the second measurement reporting setting, and a priority of the first measurement reporting setting and a priority of the second measurement reporting setting are obtained by weighting and merging the reporting rules.

12. The method according to claim 11, further comprising:
sending, by the base station, the first measurement reporting setting and the second measurement reporting setting to the terminal.

13. The method according to claim 12, further comprising:
sending, by the base station, a reporting activation indication associated with the plurality of measurement reporting parameters to the terminal.

14. A communications apparatus, comprising:
a processor;
a memory comprising a program to be executed in the processor, the processor when the program is executed is configured to perform operations of:
sending a pilot; and
receiving from a terminal, a value or values of some of a plurality of measurement reporting parameters that are associated with the pilot, wherein the some of the plurality of measurement reporting parameters conform to reporting rules, wherein the reporting rules comprise:
a reporting setting with a smaller identifier has priority over a reporting setting with a larger identifier;
a serving cell with a smaller identifier has priority over a serving cell with a larger identifier;
a reporting type involving a beam index indication has priority over a reporting type involving a rank indicator (RI); and
aperiodic measurement reporting has priority over semi-persistent measurement reporting, or semi-persistent measurement reporting has priority over periodic measurement reporting.

15. The apparatus according to claim 14, wherein the reporting type involving a beam index indication is a reporting type involving a beam index indication and beam quality; and
the some of the plurality of measurement reporting parameters conform to the reporting type involving the beam index indication and beam quality.

16. The apparatus according to claim 15, wherein the some of the plurality of measurement reporting parameters belong to a first measurement reporting setting, and among the plurality of measurement reporting parameters, a measurement reporting parameter other than the some of the plurality of measurement reporting parameters belongs to a second measurement reporting setting, wherein the first measurement reporting setting has priority over the second measurement reporting setting, and a priority of the first measurement reporting setting and a priority of the second measurement reporting setting are obtained by weighting and merging the reporting rules.

17. The apparatus according to claim 16, wherein the processor when the program is executed is further configured to perform an operation of:
sending the first measurement reporting setting and the second measurement reporting setting to the terminal.

18. The apparatus according to claim 17, wherein the processor when the program is executed is further configured to perform an operation of:
sending a reporting activation indication associated with the plurality of measurement reporting parameters to the terminal.

19. A communications system, comprising:
a base station, configured to:
send a pilot; and
receive from a terminal, a value or values of some of a plurality of measurement reporting parameters that are associated with the pilot;
the terminal, configured to:
obtain values of the plurality of measurement reporting parameters; and
send the value or values of the some of the plurality of measurement reporting parameters to the base station;
wherein the some of the plurality of measurement reporting parameters conform to reporting rules, and the reporting rules comprise:
a reporting setting with a smaller identifier has priority over a reporting setting with a larger identifier;
a serving cell with a smaller identifier has priority over a serving cell with a larger identifier;
a reporting type involving a beam index indication has priority over a reporting type involving a rank indicator (RI); and
aperiodic measurement reporting has priority over semi-persistent measurement reporting, or semi-persistent measurement reporting has priority over periodic measurement reporting.

20. The system according to claim 19, wherein the some of the plurality of measurement reporting parameters belong to a first measurement reporting setting, and among the plurality of measurement reporting parameters, a measurement reporting parameter other than the some of the plurality of measurement reporting parameters belongs to a second measurement reporting setting; and
the terminal is further configured to:
weight and merge the reporting rules to obtain a priority of the first measurement reporting setting and a priority of the second measurement reporting setting, wherein the first measurement reporting setting has priority over the second measurement reporting setting.

* * * * *